(12) United States Patent
Brioschi

(10) Patent No.: US 8,281,903 B2
(45) Date of Patent: Oct. 9, 2012

(54) BREAKING DEVICE

(75) Inventor: Cesare Brioschi, Galbiate (IT)

(73) Assignee: Sunstar Engineering Pte. Ltd., Singapore (SG)

( * ) Notice: Subject to any disclaimer, the term of this patent is extended or adjusted under 35 U.S.C. 154(b) by 414 days.

(21) Appl. No.: 12/379,783

(22) Filed: Feb. 27, 2009

(65) Prior Publication Data

US 2009/0229927 A1 Sep. 17, 2009

(30) Foreign Application Priority Data

Feb. 29, 2008 (IT) .............................. MI2008A0346

(51) Int. Cl.
*B62L 3/00* (2006.01)

(52) U.S. Cl. ..................................... 188/24.11

(58) Field of Classification Search .................... 74/489, 74/502.2; 188/24.11, 24.15, 24.22
See application file for complete search history.

(56) References Cited

U.S. PATENT DOCUMENTS

| 4,635,442 | A | * | 1/1987 | Bass ................................. 60/594 |
| 4,779,482 | A | * | 10/1988 | Kawaguchi ....................... 74/523 |
| 4,840,082 | A | | 6/1989 | Terashima |
| 5,050,381 | A | * | 9/1991 | Matsuno et al. ................. 60/584 |
| 6,457,378 | B2 | * | 10/2002 | Hatakoshi et al. ............... 74/525 |
| 6,957,534 | B2 | * | 10/2005 | Lumpkin .......................... 60/588 |
| 7,204,088 | B2 | * | 4/2007 | Uchiyama et al. ............... 60/594 |
| 2003/0121736 | A1 | | 7/2003 | Lumpkin |
| 2003/0183038 | A1 | * | 10/2003 | Cornolti et al. ................. 74/525 |
| 2006/0278031 | A1 | * | 12/2006 | Takizawa et al. ............. 74/502.2 |
| 2007/0284203 | A1 | | 12/2007 | Tetsuka |

FOREIGN PATENT DOCUMENTS

| EP | 0 405 945 | 1/1991 |
| EP | 1 160 152 | 12/2001 |
| EP | 1 439 116 | 7/2004 |
| EP | 1 733 959 | 12/2006 |
| WO | 2005/049416 | 6/2005 |

OTHER PUBLICATIONS

European Search Report dated Mar. 11, 2010.

* cited by examiner

*Primary Examiner* — David Dunn
*Assistant Examiner* — Philip Gabler
(74) *Attorney, Agent, or Firm* — Jacobson Holman PLLC

(57) ABSTRACT

A braking device for vehicles comprises a body (12), a lever (13) hinged to said body that can be operated by a user of the vehicle, a hydraulic cylinder (17) having a cylinder-shaped chamber integral with the body (12) for connecting to a hydraulic braking circuit of the vehicle, the cylinder (17) comprising a piston (25) sliding in the chamber (24) and moving as a result of the action of said lever (13) to control vehicle braking. The lever (13) acts on the piston to cause the braking action by means of a cam mechanism (20, 21).

26 Claims, 2 Drawing Sheets

BREAKING DEVICE

The present invention relates to an innovative braking device for vehicles, in particular for motorcycles.

The production of braking devices is known to prior art for fitting on the handlebars of a motorcycle to control braking.

The device comprises a lever that can be operated by hand by the user and a hydraulic control cylinder connected to the hydraulic braking circuit of the motorcycle.

The movement is transmitted by the lever to the cylinder piston by means of a rod which on one side is hinged to the lever, and on the other acts on the piston to push it towards the inside of the cylinder chamber during braking. The lever arm of the force applied to the cylinder piston is constant for each angular position of the lever that can be operated by the user.

The device of prior art does not allow satisfactorily regulating the stroke of the piston according to the angle of rotation of the lever. The braking sensitivity that can be obtained is rather limited, its being necessary to turn the lever considerably to achieve a piston stroke sufficient enough to generate relatively high pressures in the braking circuit of the motorcycle.

Furthermore, using the devices of prior art, the force exercised by the lever is not parallel to the cylinder axis, thereby producing frictions and a dispersion of the force applied in transversal components. This makes braking harder for the user of the motorcycle.

The general object of the present invention is to overcome the above-mentioned problems and provide a braking device that can be easily regulated with a high degree of flexibility so as to obtain a desired brake response according to the rotation of the lever.

A further object of the invention is to provide a braking device that allows obtaining a satisfactorily high braking sensitivity.

Another object of the invention is to provide a braking device that allows braking in an easy way, with limited effort on the part of the user.

In view of such objects the idea occurred to make, according to the invention, a braking device for vehicles comprising a body, a lever hinged to said body that can be operated by a user of the vehicle, a hydraulic cylinder having a chamber integral with the body and designed to be connected to a hydraulic braking circuit of the vehicle, the cylinder comprising a piston sliding in the chamber and moving as a result of the action of said lever to control vehicle braking, characterised in that the lever acts on the piston to cause braking by means of a cam mechanism.

To make clearer the explanation of the innovative principles of the present invention and its advantages with respect to prior art, a possible exemplary embodiment applying such principles will be described below, with the aid of the attached drawings. In the drawings.

Figure 1:
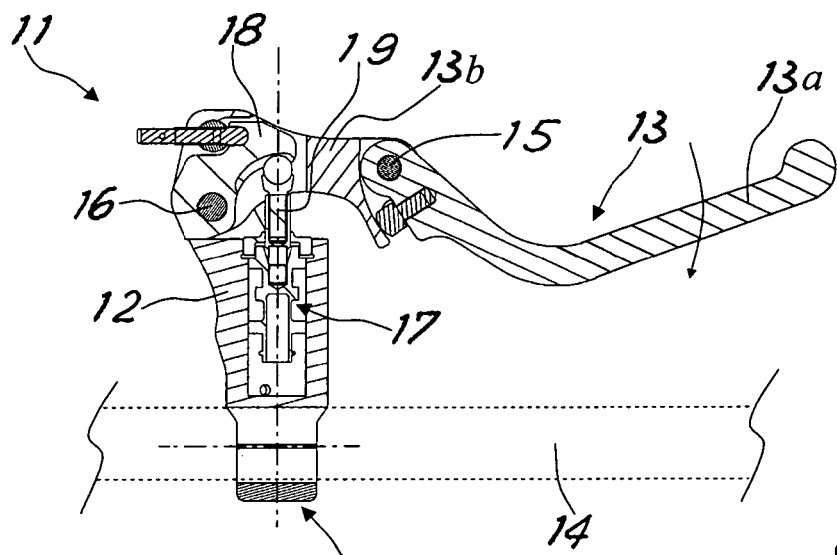
FIG. 1 represents an overall cutaway view of a braking device according to the invention.

With reference to the figures, FIG. 1 shows a braking device 11 intended to be mounted on a motorcycle to manually control vehicle braking.

The device comprises a body 12 that can be fastened to a handlebar 14 of the motorcycle (shown schematically by a broken line in the illustration) and a lever 13 hinged to the body 12 by means of the pin 16. The lever 13 can be operated manually by the user of the motorcycle to be pushed in the direction of the arrow indicated in FIG. 1 and perform the braking action.

The body 12 has fastening means 26 for fastening to the handlebar 14. The fastening means can include a sleeve portion 27, itself made using solutions well known in the sector.

The device 11 comprises a hydraulic cylinder 17 having a chamber 24 (shown in FIG. 2) integral with the body 12 and intended to be connected to a hydraulic braking circuit of the vehicle (not shown in the illustration). According to prior art, the hydraulic circuit is connected to a braking caliper acting on the discs of the brake fitted to the wheels to be braked. The hydraulic cylinder 17 is connected to such hydraulic circuit according to prior art to control a braking pressure on the liquid (normally oil) contained in the braking circuit and in the caliper.

The cylinder 17 comprises a piston 25 sliding inside the chamber 24. The piston is pushed by return action means into the idle position protracted towards the outside of the chamber 24. The return action means can be made with a spring inside the cylinder (not shown in the illustration), according to solutions known in themselves and easily imaginable by the technician of the sector. Advantageously, the chamber 24 of the hydraulic cylinder 17 is made up all one piece in the body 12 of the device.

The fastening means 26 are arranged at a lower extremity of the cylinder 17. At the opposite extremity of the cylinder 17, the body 12 has a pair of parallel flanges 12a onto which are hinged the lever 13 and the cam element 18. The illustration shows only one of the two flanges 12a, but it must be understood that the body 12 has two of these, defining an interspace in which are housed the lever 13 and the cam element 18.

The piston 25 is mobile towards the inside of the chamber 24 under the action of the lever 13 to control the braking of the vehicle. According to the invention, the lever 13 acts on the piston to perform the braking action by means of a cam mechanism 20, 21.

The cam mechanism comprises a cam surface 20 that is integral during use with the lever 13 and is suitable, during braking, for acting on a driven element 21 provided on a rod 19 connected to the piston 25, for example by screwing up.

The cam surface 20, advantageously, is made on a cam element 18 constrained to the lever 13 with adjustable position.

Figure 2:
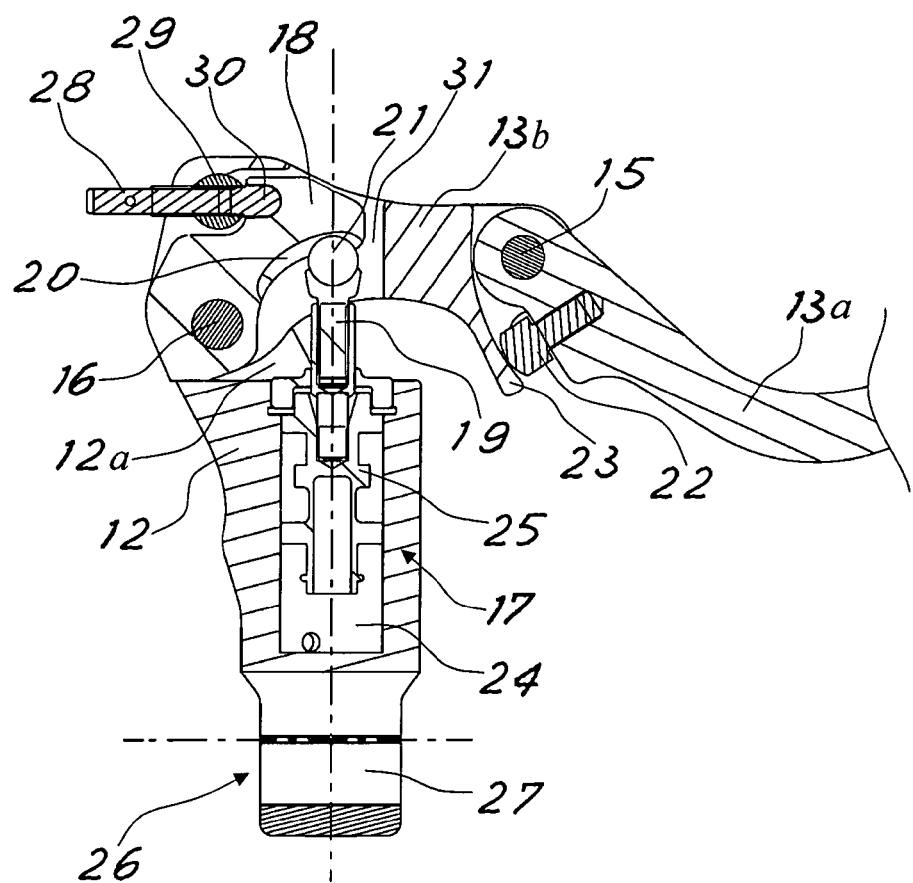
FIG. 2 represents an enlarged view of a detail of the previous figure.

As the FIG. 2 clearly shows, the cam element 18 is hinged to the lever 13. The device 11 comprises a registration dowel 28 fitted in a threaded hole of a pin 29 mounted turning on the lever 13. One extremity of the dowel 28 is accessible from outside to perform the registration, while the opposite extremity 30 is housed in a flared seat formed in the cam element 18 to push the cam element towards the driven element 21. By registering the dowel, the angular position of the cam element 18 can be adjusted with respect to the lever 13.

The return action means of the piston 25, acting to push the piston in the protracted position from the chamber 24, allow constantly maintaining contact between the driven element 21 and the cam surface 20.

Preferably, the cam element 18 and the lever 13 are hinged on the same pin 16 constraining to the body 12. This permits making the structure of the device 11 particularly compact and inexpensive, limiting the number of components needed for its assembly.

The hydraulic cylinder 17 preferably has an axis substantially at right angles to the extension of the lever 13, and to the axis of the handlebar 14 of the motorcycle.

The cam surface 20 is arranged in intermediate position between the hinging 16 of the lever 13 to the body 12 and the portion 13a of the lever that can be operated by the vehicle user.

The driven element 21 is made with a more or less spherical portion fastened to an extremity of the rod 19 integral with the cylinder piston. The spherical shape of the driven element 21 allows limiting the friction of the cam mechanism in an advantageous way.

Advantageously, the cam surface 20 has a concave, arched profile, and can form a groove along which the spherical portion 21 slides during use.

The cam surface 20 is preferably shaped so that the push exercised on the spherical portion 21 is always substantially parallel with the axis of the cylinder 17 for each angular position of the lever. This allows reducing the frictions to the utmost as well as any other dispersion of the force applied by the user in components transversal to the cylinder axis. Such circumstance permits making the braking action easier, limiting the effort required on the part of the user to reach the hydraulic pressures needed for braking.

Figure 3:
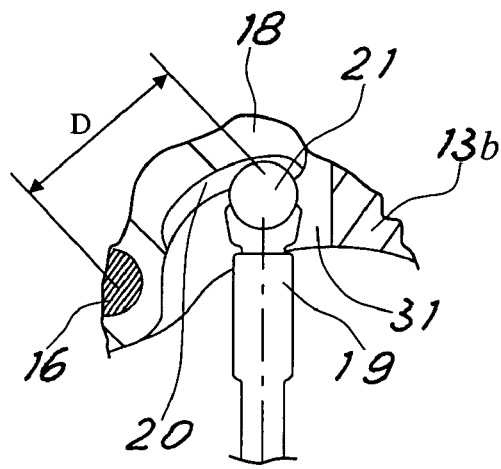
FIGS. 3 and 4 represent two detailed views of the cam surface acting on the rod connected to the cylinder piston in idle condition and in braking condition.
Figure 4:
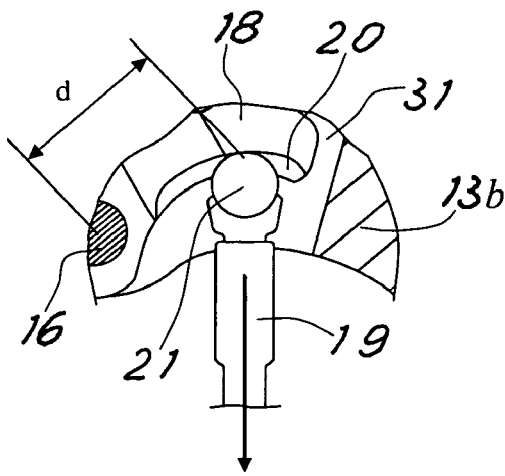

The cam mechanism 20, 21 is preferably configured so the distance between the hinging 16 of the lever 13 to the body 12 and the point of application of the force from the lever to the cylinder piston drops on rotation of the lever 13 during braking. As is clearly shown in the FIGS. 3 and 4, at the start of braking, the lever arm "D" (FIG. 3) is greater than the lever arm "d" (FIG. 4) in braking condition.

This allows limiting the amount of force the user has to apply to the lever as the piston 25 moves forward in the chamber 24, making it possible to achieve high braking pressures in the final part of the stroke of the lever 13.

Advantageously, the lever 13 is formed of two parts 13a, 13b. The part 13a forms the portion of the lever that can be operated by the user, while the second part 13b is hinged to the body 12 of the device and has a cavity 31 inside which the cam element 18 is housed. The cavity 31 is formed between two parallel flanges of the portion 13b of the lever; the cutaway figure shows only the lower flange to allow viewing the cam element 18.

The part 13a of the lever has an angular position adjustable with respect to the part 13b, so as to adapt to the requirements and to the habits of the motorcycle rider.

The two parts 13a, 13b are hinged together by means of the pin 15. The adjustment of the position of the part 13a is done by means of the setscrew 22 which is fitted in a hole in the part 13a and has its head resting on the flange 23 of the part 13b of the lever.

By turning the lever 13 in the direction indicated in FIG. 1, the cam mechanism 29, 21 transfers the rotary movement of the lever to the piston 25 of the cylinder, by means of the rod 19. This way, a braking pressure is exercised on the oil of the hydraulic braking circuit of the motorcycle.

Figure 5:
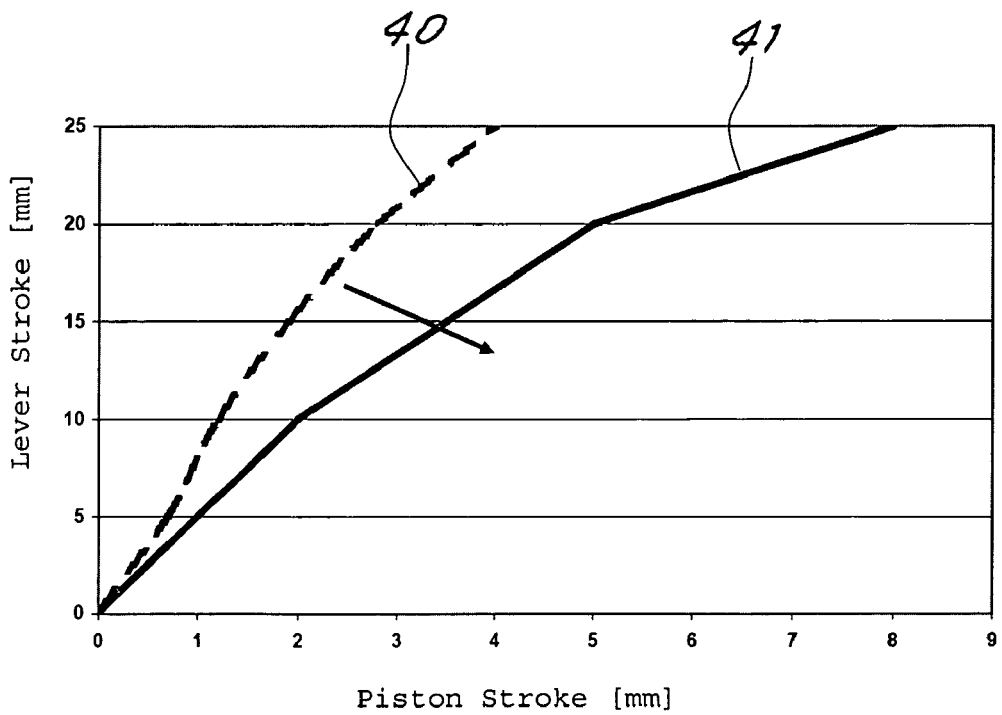
FIG. 5 represents a graph showing the variation of the piston stroke according to the stroke of the lever, both for the devices of prior art and for the device according to the invention.

The FIG. 5 shows a graph that indicates the pattern of the stroke of the piston 25 according to the stroke of the lever 13, in the case of devices according to prior art (curve 40 broken line) and in the case of the device according to the invention (curve 41 unbroken line).

As can be seen, thanks to the particular outline of the cam surface 20, the curve 41 is lower than the curve 40 because, the stroke of the lever 13 being equal, it is possible to achieve a longer stroke of the piston with respect to the prior art, thereby obtaining a more sensitive braking device.

The solution of using a cam mechanism to transmit movement to the cylinder piston permits regulating and obtaining a desired braking sensitivity according to need. The pattern of piston movement according to lever rotation can be changed by adjusting the cam surface outline, obtaining a preset response of the braking device.

The chart below shows pressure values of the braking liquid and of the piston stroke, correlated with the stroke of the lever and its rotation, using a braking device according to the described embodiment of the invention.

| Lever rotation angle | Lever stroke (mm) | Piston stroke (mm) | Oil pressure (bar) |
| --- | --- | --- | --- |
| 0° | 0 | 0 | 0 |
| 3° | 5 | 1 | 4 |
| 6° | 10 | 2 | 11 |
| 9° | 15 | 3.5 | 13.5 |
| 12° | 20 | 5 | 16 |
| 15° | 25 | 8 | 20 |

At this point, it becomes evident that the objects of the present invention have been achieved.

In particular, a braking device has been provided that permits easily and flexibly regulating the stroke of the piston and the braking pressure obtainable according to the rotation angle of the lever.

The device has a compact and inexpensive structure. The braking action can be made easier thanks to the fact that the lever arm of the force applied to the cylinder piston drops when the lever is rotated. Furthermore, the forces applied to the cylinder are almost always parallel with its axis, thus making it possible to reduce frictions to the utmost and avoid losing part of the force applied by the user in components transversal to the cylinder.

Naturally, the above description of an embodiment applying the innovative principles of the present invention is shown by way of example of such innovative principles and should not therefore be deemed as limiting the patent rights claimed herein.

For example, it remains understood that the braking device according to the invention could also be applied to different types of vehicles, and not necessarily to a motorcycle.

The invention claimed is:

1. A braking device for vehicles comprising a body, a lever hinged at a hinge point on said body that can be operated by a user of the vehicle, a hydraulic cylinder having a cylindrical chamber integral with the body and meant to be connected to a hydraulic braking circuit of the vehicle, the cylinder comprising a piston sliding in the chamber and moving under the action of the said lever to control the braking action of the vehicle, characterised in that the lever acts on the piston to achieve the braking action by means of a cam mechanism, wherein the lever has a cam surface with a concave profile forming a groove along which a driven element slides during use, with said driven element being provided on a rod connected to the piston of the hydraulic cylinder to control the braking action; and the cam surface is shaped so that a push force exerted on the driven element by the cam is substantially parallel to the axis of the cylinder for each angular position of the lever.

2. The device as claimed in claim 1, characterised in that the lever is formed in two parts, a first part forming a portion that can be operated by the user, and the second part being hinged to the body of the device.

3. The device as claimed in claim 2, characterised in that said first part of the lever has an adjustable angular position with respect to the second part.

4. The device as claimed in claim 1, characterised in that the driven element driven by the cam is made with a substantially spherical portion fastened to an extremity of a rod integral with the piston of the cylinder.

5. The device as claimed in claim 1, characterised in that the chamber of the cylinder is a one-piece assembly with the body of the device.

6. The device as claimed in claim 1, characterised in that the body of the device has means of fastening to a handlebar of the vehicle to be braked, the hydraulic cylinder being arranged substantially between said fastening means and the hinge point of the lever to the body.

7. The device as claimed in claim 1, characterised in that the cam surface is made on a cam element constrained to the lever with adjustable position.

8. The device as claimed in claim 7, characterised in that the position of the cam element can be adjusted by rotation with respect to the lever.

9. The device as claimed in claim 8, characterised in that the cam element is hinged to the lever, a registration dowel being fitted in a hole of a pin that is turnably mounted on the lever, one extremity of the dowel being accommodated in a flared seat of the cam element to push it towards the driven element.

10. The device as claimed in claim 7, characterised in that the cam element and the lever are hinged on the same pin constraining the cam element and the lever to the body of the device.

11. The device as claimed in claim 7, characterised in that the lever is formed in two parts, a first part forming a portion that can be operated by the user, the second part being hinged to the body of the device and said second part has a cavity inside which the cam element is housed.

12. The device as claimed in claim 1, characterised in that the hydraulic cylinder has an axis substantially at a right angle to the extension of the lever.

13. The device as claimed in claim 1, characterised in that the cam surface is in an intermediate position between the hinge point of the lever to the body and a portion of the lever that can be operated by the user of the vehicle.

14. A braking device for vehicles comprising a body, a lever hinged at a hinge point on said body that can be operated by a user of the vehicle, a hydraulic cylinder having a cylindrical chamber integral with the body and meant to be connected to a hydraulic braking circuit of the vehicle, the cylinder comprising a piston sliding in the chamber and moving under the action of the said lever to control the braking action of the vehicle, characterised in that the lever acts on the piston to achieve the braking action by means of a cam mechanism, and further characterised in that the cam mechanism is configured so that when the lever is turned during the braking action in a direction applying a push force to the brake piston to perform the braking action, distance reduces between the hinge point of the lever and a point where the lever exerts a force on.

15. The device as claimed in claim 14, characterised in that the lever is formed in two parts, a first part forming a portion that can be operated by the user, and the second part being hinged to the body of the device.

16. The device as claimed in claim 15, characterised in that said first part of the lever has an adjustable angular position with respect to the second part.

17. The device as claimed in claim 14, characterised in that the driven element driven by the cam is made with a substantially spherical portion fastened to an extremity of a rod integral with the piston of the cylinder.

18. The device as claimed in claim 14, characterised in that the chamber of the cylinder is a one-piece assembly with the body of the device.

19. The device as claimed in claim 14, characterised in that the body of the device has means of fastening to a handlebar of the vehicle to be braked, the hydraulic cylinder being arranged substantially between said fastening means and the hinge point of the lever to the body.

20. The device as claimed in claim 14, characterised in that the cam surface is made on a cam element constrained to the lever with adjustable position.

21. The device as claimed in claim 20, characterised in that the position of the cam element can be adjusted by rotation with respect to the lever.

22. The device as claimed in claim 21, characterised in that the cam element is hinged to the lever, a registration dowel being fitted in a hole of a pin that is turnably mounted on the lever, one extremity of the dowel being accommodated in a flared seat of the cam element to push it towards the driven element.

23. The device as claimed in claim 20, characterised in that the cam element and the lever are hinged on the same pin constraining the cam element and the lever to the body of the device.

24. The device as claimed in claim 20, characterised in that the lever is formed in two parts, a first part forming a portion that can be operated by the user, the second part being hinged to the body of the device and said second part has a cavity inside which the cam element is housed.

25. The device as claimed in claim 14, characterised in that the hydraulic cylinder has an axis substantially at a right angle to the extension of the lever.

26. The device as claimed in claim 14, characterised in that the cam surface is in an intermediate position between the hinge point of the lever to the body and a portion of the lever that can be operated by the user of the vehicle.

* * * * *